US010691353B1

(12) United States Patent
Peterson et al.

(10) Patent No.: US 10,691,353 B1
(45) Date of Patent: Jun. 23, 2020

(54) CHECKING OF DATA DIFFERENCE FOR WRITES PERFORMED VIA A BUS INTERFACE TO A DUAL-SERVER STORAGE CONTROLLER

(71) Applicant: INTERNATIONAL BUSINESS MACHINES CORPORATION, Armonk, NY (US)

(72) Inventors: Beth A. Peterson, Tucson, AZ (US); Kevin J. Ash, Tucson, AZ (US); Chung M. Fung, San Francisco, CA (US); Lokesh M. Gupta, Tucson, AZ (US); Kyler A. Anderson, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/206,115

(22) Filed: Nov. 30, 2018

(51) Int. Cl.
*G06F 3/06* (2006.01)
*G06F 12/0868* (2016.01)
*G06F 12/0804* (2016.01)

(52) U.S. Cl.
CPC .......... *G06F 3/0619* (2013.01); *G06F 3/065* (2013.01); *G06F 3/0611* (2013.01); *G06F 3/0685* (2013.01); *G06F 12/0804* (2013.01); *G06F 12/0868* (2013.01); *G06F 3/067* (2013.01)

(58) Field of Classification Search
None
See application file for complete search history.

(56) References Cited

U.S. PATENT DOCUMENTS

| 8,140,936 B2 | 3/2012 | Gower et al. |
| 8,271,578 B2 | 9/2012 | Sheffi et al. |
| 9,317,436 B2 | 4/2016 | Pan |
| 9,459,957 B2 | 10/2016 | Sella et al. |

FOREIGN PATENT DOCUMENTS

| CN | 103226519 | 7/2013 |
| CN | 105094696 | 11/2015 |

OTHER PUBLICATIONS

English Translation of CN103226519 dated Jul. 31, 2013, pp. 13.
English Translation of CN105094696 dated Nov. 25, 2015, pp. 8.
Z. Yang, et al., "AutoReplica: automatic data replica manager in distributed caching and data processing systems", (2016). Performance Computing and Communications Conference (IPCCC), 2016 IEEE 35th International, pp. 1-6.

(Continued)

*Primary Examiner* — Brian R Peugh
(74) *Attorney, Agent, or Firm* — Rabindranath Dutta; Konrad Raynes Davda & Victor LLP

(57) ABSTRACT

A storage controller receives a plurality of synchronous writes from a host via a bus interface, wherein each of the synchronous writes is received for writing to a first node and a second node of the storage controller. For each record of a track written to the first node and the second node, an error detecting code is computed on writing the record. In response to determining that computed error detecting codes do not match for any corresponding records of the track in the first node and the second node, an indication of an error is transmitted from the storage controller to the host.

24 Claims, 10 Drawing Sheets

(56) References Cited

OTHER PUBLICATIONS

A. Gonzalez, et al., "A data cache with multiple caching strategies tuned to different types of locality", (2014). ACM International Conference on Supercomputing 25th Anniversary Volume, pp. 217-226.

J.G. Biondi, Jr., et al., "Getting Started with IBM zHyperLink for z/OS", (2018). IBM.com Redbooks, IBM International Technical Support Organization Jun. 2018, Document REDP-5493-00, pp. 1-118.

B. Dusfrasne, et al., "IBM DS8880 Architecture and Implementation", (2018). IBM.com Redbooks, IBM International Technical Support Organization Aug. 2018, Document SG24-8323-04, pp. 1-514.

CHECKING OF DATA DIFFERENCE FOR WRITES PERFORMED VIA A BUS INTERFACE TO A DUAL-SERVER STORAGE CONTROLLER

BACKGROUND

1. Field

Embodiments relate to the checking of data difference for writes performed via a bus interface to a dual-server storage controller.

2. Background

A storage system may control access to storage for one or more host computational devices that may be coupled to the storage system over a network. A storage management application that executes in the storage system may manage a plurality of storage devices, such as disk drives, tape drives, flash drives, direct access storage devices (DASD), etc., that are coupled to the storage system. A host may send Input/Output (I/O) commands to the storage system and the storage system may execute the I/O commands to read data from the storage devices or write data to the storage devices. The storage system may also be referred to as a storage controller.

The storage system may include two or more servers, where each server may be referred to as a node, a storage server, a processor complex, a Central Processor Complex (CPC), or a Central Electronics Complex (CEC). Each server may be included in a cluster. Each server may have a plurality of processor cores and the servers may share the workload of the storage system. In a two server configuration of the storage system referred to as a dual-server storage controller, either server can failover to the other if there is a failure or a planned downtime for one of the two servers.

The storage system attempts to maintain two copies of the data while data is moving through the storage system. The servers have two areas of their primary memory that are used for holding host data: cache and non-volatile storage (NVS). NVS contains write data until the data is destaged from the cache to the storage drives. When a write is sent to a volume and both the servers are operational, the write data is placed into the cache of the owning server and into the NVS of the other server, where the owning server may be referred to as a cache node or CA node and the other server may be referred to as a NA node. The NVS copy of the write data may be accessed if a write failure occurs and the cache is empty or possibly invalid in the owning server. Otherwise, the NVS copy of the write data is discarded after destage operations from cache to the storage drives are complete.

When an input/output (I/O) request is performed by an application, several processes are performed to complete the I/O request and this affects the I/O latency. The I/O latency may be a significant part of application response time. ZHYPERLINK* (also referred to as zHyperLink) is a mechanism that is used to reduce the I/O latency by providing a fast, reliable, and direct communication path between a host and a storage controller. This goal is accomplished by installing zHyperLink adapters on the host and storage controller, and connecting the zHyperLink adapters by zHyperLink cables. This configuration creates point-to-point connection between the host and the storage controller and reduces the I/O response time in comparison to other mechanisms. Such low response time is achieved by using synchronous I/O (syncio) requests, which reduces the time that is required for some functions, such as for I/O interrupts and dispatch times.

Standard I/O processing requires I/O operations to perform a series of time-consuming tasks that includes dispatching, interrupt handling, Central Processing Unit (CPU) queue time, CPU cache reload activities, etc. These tasks and other tasks that are required for I/O processing cause the I/O response time to be relatively long compared to transferring data within virtual storage. When a syncio is performed, the CPU waits or "spins" until the I/O is completed, or the timeout value is reached. zHyperLink that uses syncio may significantly reduce the time that is required to complete the I/O because the dispatching, interrupt handling, CPU queue time, and CPU cache reload activities are no longer necessary. Further details of zHyperLink may be found in the publication "Getting Started with IBM zHyperLink for z/OS" published June 2018, by International Business Machines Corporation. Additional details of zHyperLink in the context of a storage controller may be found in the publication "IBM DS8880 Architecture and Implementation (Release 8.5)" published August 2018 by International Business Machines Corporation.

U.S. Pat. No. 9,459,957 discloses a system and method for a network interface for communicating with a node, wherein the circuitry is configured to communicate with one or more other nodes over a communication network so as to carry out, jointly with one or more other nodes, a redundant storage operation that includes a redundancy calculation, including performing the redundancy calculation on behalf of the node. U.S. Pat. No. 8,140,936 discloses a system and method for a combined error correction code and cyclic redundancy check code for a memory channel. U.S. Pat. No. 9,317,436 discloses a system and method for cache node processing which includes generating a cache node in response to a request to write data to storage devices.

SUMMARY OF THE PREFERRED EMBODIMENTS

Provided are a method, system, and computer program product in which a storage controller receives a plurality of synchronous writes from a host via a bus interface, wherein each of the synchronous writes is received for writing to a first node and a second node of the storage controller. For each record of a track written to the first node and the second node, an error detecting code is computed on writing the record. In response to determining that computed error detecting codes do not match for any corresponding records of the track in the first node and the second node, an indication of an error is transmitted from the storage controller to the host. As a result, errors are found faster in such mechanisms in comparison to mechanisms in which the entirety of the track is compared between the first and the second node.

In additional embodiments, in response to determining that computed error detecting codes match for all corresponding records of the track in the first node and the second node, the track is hardened in the storage controller. As a result, hardening of the track may take place earlier in comparison to mechanisms in which the entirety of the track is compared between the first and the second node.

In further embodiments, the synchronous writes are performed over a bus interface between the host and the storage controller via a syncio process, wherein a summary error detecting code comprising the error detecting code of a plurality of records is compared for records of the first node and the second node to determine whether the records of the first node and the records of the second node have been written correctly via the plurality of synchronous writes. As a result, the speed of hardening of tracks and detection of errors in syncio is improved.

In additional embodiments, the syncio process allows the host to hold an application thread in a spin loop waiting for a write operation to complete, wherein the syncio process performs reservation of tracks for performing writes for a greater duration of time prior to performing the writes on the tracks in comparison to other processes that perform writes on the tracks via a network interface. As a result, the speed of error detection is improved in syncio.

In certain embodiments, a synchronous write is written to a cache of the first node and a non-volatile storage (NVS) of the second node, and wherein the error detecting code is a longitudinal redundancy check (LRC) code. As a result, a determination is made as to whether the track has been written correctly to the cache and the NVS.

In further embodiments a bit by bit comparison of the track is also performed between the first node and the second node prior to the hardening. As a result, even if the comparison of error detection codes associated with records misses detecting an error, the bit by bit comparison of the track may detect an error.

In further embodiments, in response to receiving the indication of the error, the host recovers from the error by at least retransmitting writes for records with different computed error codes in the first and second node. As a result, the host may be able to recover faster from failures of syncio operations.

In further embodiments, in response to receiving the indication of the error, the host performs additional checks on data transmitted via the synchronous writes to the first node and the second node. As a result, the host may be able to recover faster from failures of syncio operations.

BRIEF DESCRIPTION OF THE DRAWINGS

Referring now to the drawings in which like reference numbers represent corresponding parts throughout.

DETAILED DESCRIPTION

Figure 1:
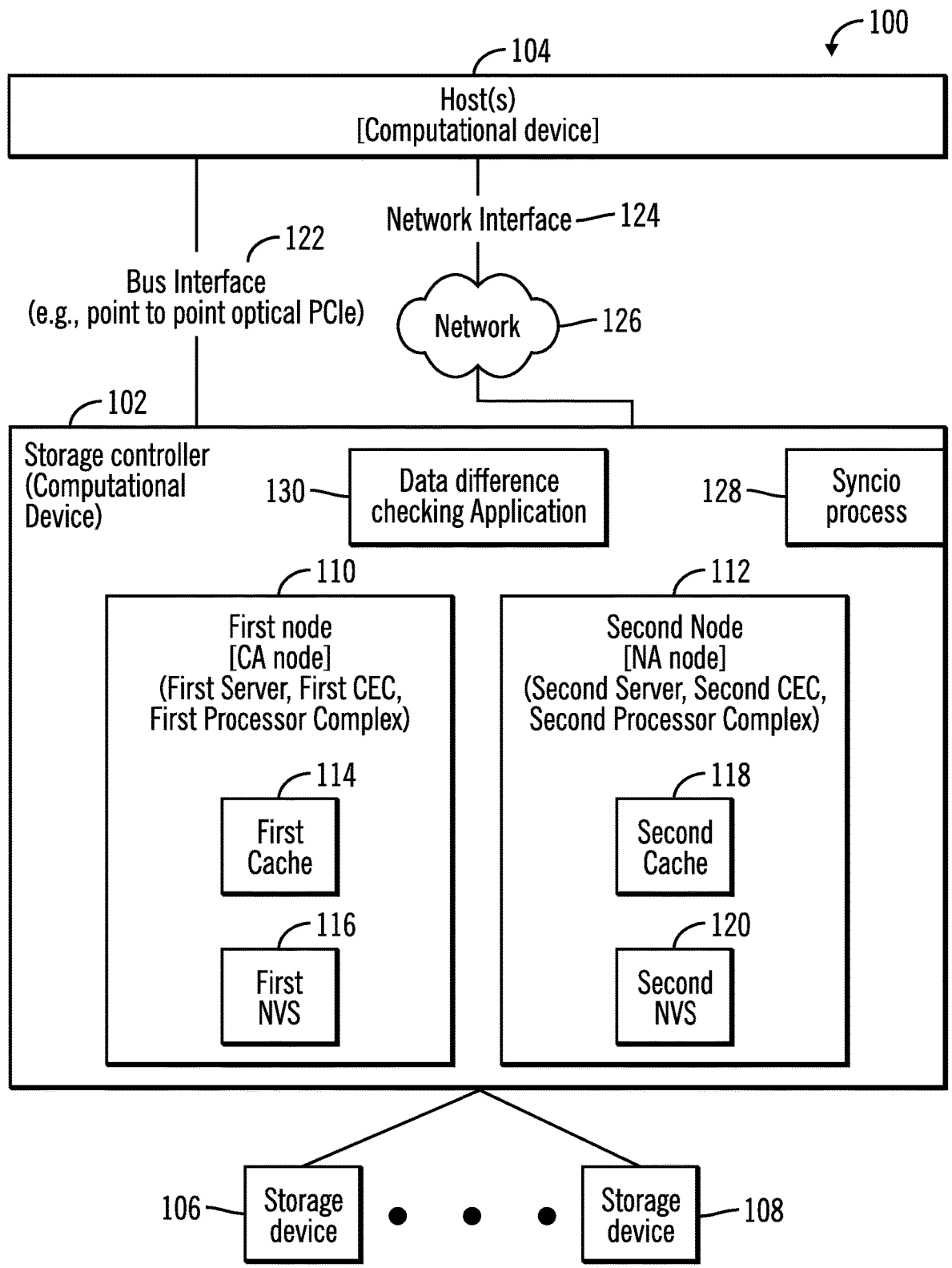
FIG. 1 illustrates a block diagram of a computing environment comprising a storage controller coupled to one or more hosts and one or more storage devices, where syncio based writes occur from the one or more hosts to the storage controller, in accordance with certain embodiments.

In the following description, reference is made to the accompanying drawings which form a part hereof and which illustrate several embodiments. It is understood that other embodiments may be utilized and structural and operational changes may be made.

Syncio (also referred to as sync I/O or synchronous I/O) comprises an attachment hardware and protocol for computational devices. Syncio is designed for very low latency random reads and small block sequential writes. Syncio connections between computational devices may be over point to point optical Peripheral Component Interconnect Express (PCIe) interfaces. Syncio operations behave differently than traditional I/O in that in syncio a host computational device may hold an application thread in a spin loop while waiting for the I/O operation to complete. This avoids the need for processor cycles to perform the two context swaps of traditional I/O, the need to perform operations for putting the I/O thread to sleep and then re-dispatching the I/O thread, and the need for an I/O interrupt. Syncio operations may be performed by a syncio process and may correspond to a high speed data transfer process from a host to a storage controller. Syncio writes may be referred to as zHyperLink (ZHL) writes.

For syncio, writes from the host are split to a first node [e.g., the cache (CA) node] of the storage controller and a second node [e.g. the protected NVS node referred to as NA node] of the storage controller. Each individual write is performed on a specific track. Once the write has successfully completed on each of the CA and NA nodes, the write itself is considered successful However, since the writes are performed separately once all writes are performed to the track and the track is to be hardened in the storage controller, there is an opportunity to ensure that the writes were successful and identical. Some checks may easily be made by comparing the number of writes, the records written, etc., but the actual checking on a bit by bit basis may be far too time consuming to perform for every track. Instead in certain mechanisms, a periodic checking is performed at periodic intervals to ensure a general level of correctness. However, the faster an error is detected, the better it is. Nevertheless, it is just too time consuming in terms of resource usage and performance to perform the bit by bit check of the CA and NA nodes on each track commit.

Certain embodiments provide a system, method and computer program product for high performance data difference checking, where a summary longitudinal redundancy check (LRC) value is created for both protected and cache nodes at the conclusion of the syncio writes. The summary LRC is compared to perform corrective actions when there is a mismatch. This summary LRC is generated from the data fields since the headers of data fields have adequate information contained within the data field to convey the starting and ending points of each data field for a track. In certain embodiments, a 2 byte LRC is small enough to be easily transmitted from the NA node to the CA node for comparison. Once the CA node is ready for a track commit, a summary LRC is generated using a similar mechanism to the NA node. The checking may be performed based on workload, performance, or other criteria, such as how frequently differences are detected. As a result improvements are made to computer technology by detecting write differences on multiple nodes using a summary value and by the notification of a detected error, and a recovery is performed by the host from the error upon detection of the error.

Exemplary Embodiments

FIG. 1 illustrates a block diagram of a computing environment 100 comprising a storage controller 102 coupled to one or more hosts 104 and one or more storage devices 106, 108, where syncio based writes occur from the one or more hosts 104 to the storage controller 102, in accordance with certain embodiments.

The storage controller 102 allows the one or more hosts 104 to perform input/output (I/O) operations with logical storage maintained by the storage controller 102. The physical storage corresponding to the logical storage with which the storage controller 102 allows the hosts 104 to perform operations may be found in one or more of the storage devices 106, 108 or in the memory of the storage controller 102. In a dual-server configuration of the storage controller 102, the storage controller may be comprised of a first node 110 and a second node 112, where the first node 110 may also be referred to as a cache node or CA node, a first server, a first CEC, or a first processor complex, and the second node 112 may be referred to as a NA node, a second server, a second CEC, or a second processor complex.

The first node 110 includes memory comprising a first cache 114 and a first NVS 116, and the second node 112 includes memory comprising a second cache 118 and a second NVS 120.

The cache 114, 118 may in certain embodiments comprise a write cache partitioned into one or more ranks, where each rank may include one or more storage tracks. The cache 114, 118 may be any suitable cache known in the art or developed in the future. In some embodiments, the cache 114, 118 may be implemented with a volatile memory and/or non-volatile memory. The cache 114, 118 may store both modified and unmodified data, where the cache 114, 118 may periodically destage (i.e., move) data from the cache 114, 118 to one or more storage devices 106, 108 controlled by the nodes 110, 112.

The NVS 116, 120 may also be referred to as a "persistent" cache and is implemented with non-volatile memory that may or may not utilize external power to retain data stored therein. In some embodiments, a backup power source, such as a battery, supplies the NVS 116, 120 with power to retain the data stored therein in case of power loss. The NVS 116, 120 may store modified data. An application is made aware that an I/O operation is complete once data has successfully been written to cache and the NVS. Data integrity and availability is maintained by retaining two copies of the data until it is hardened to disk, one copy in cache on one node and the second in NVS of the other node. NVS is protected by battery backup. Normal access to the data is from the copy retained in the cache. In certain embodiments, the NVS 116, 120 may also act like a write cache.

In certain embodiments, the host 104 may be coupled to the storage controller 102 via a bus interface [e.g., a point to point optical Peripheral Component Interconnect Express (PCIe) interface] 122 and a network interface 124 that communicates via a network 126 to the storage controller 102. Syncio operations from the host 104 may be performed over the bus interface 122. Traditional I/O operations from the host 104 may be performed over the network interface 124. The bus interface 122 may comprise a faster access channel for I/O than the network interface 124. Additional bus interface technology to extend the bus interface 122 may be utilized, including PCIe extender cables or components, such as a distributed PCIe switch, to allow PCIe over Ethernet, such as with the ExpEther technology. The network interface 124 may couple the host 104 via a network adapter to a network 126 that includes the storage controller 102.

The storage controller 102 include a syncio process 128 that allows the performing of syncio based writes from the hosts 104 to the storage controller 102. In certain embodiments the syncio process 128 may be implemented in software, firmware, hardware or any combination thereof.

The storage controller 102, the first node 110, the second node 112, and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc. The plurality of nodes 110, 112 may provide redundancy because if one node undergoes a failure from which recovery is not possible, an alternate node may perform the functions of the node that failed. Each of the nodes 110, 112 may include one or more processors and/or processor cores.

The storage controller 102, the nodes 110, 112 and the hosts 104 may be elements in any suitable network, such as, a storage area network, a wide area network, the Internet, an intranet. In certain embodiments, storage controller 102, the nodes 110, 112 and the hosts 104 may be elements in a cloud computing environment.

For syncio, the writes from the host 104 are split to a first node 110 [e.g., the cache (CA) node] of the storage controller 102 and a second node 112 [e.g., the protected NVS node referred to as NA node] or the storage controller 102. Each individual write is performed on a specific track. Once the write has successfully completed on each of the CA and NA nodes, the write itself is considered successful.

Certain embodiments provide a system, method and computer program product in which a data difference checking application 130 that executes in the storage controller 102 provides mechanisms for high performance data difference checking, where a summary longitudinal redundancy check (LRC) value is created for both the first node 110 and the second node 112 at the conclusion of the syncio writes. The summary LRC is compared to perform corrective actions when there is a mismatch. This summary LRC is generated from the data fields since the headers of data fields have adequate information contained within the data field to convey the starting and ending points of each data field for a track.

The data difference checking application 130 and the syncio process 128 may execute in any or all of the nodes 110, 112 or may be an application that executes when virtualization is performed to access the hardware elements of the storage controller 102. In certain embodiments, the data difference checking application 130 and the syncio process 128 may be implemented in software, firmware, hardware or any combination thereof and may be included in a storage management application.

Figure 2:
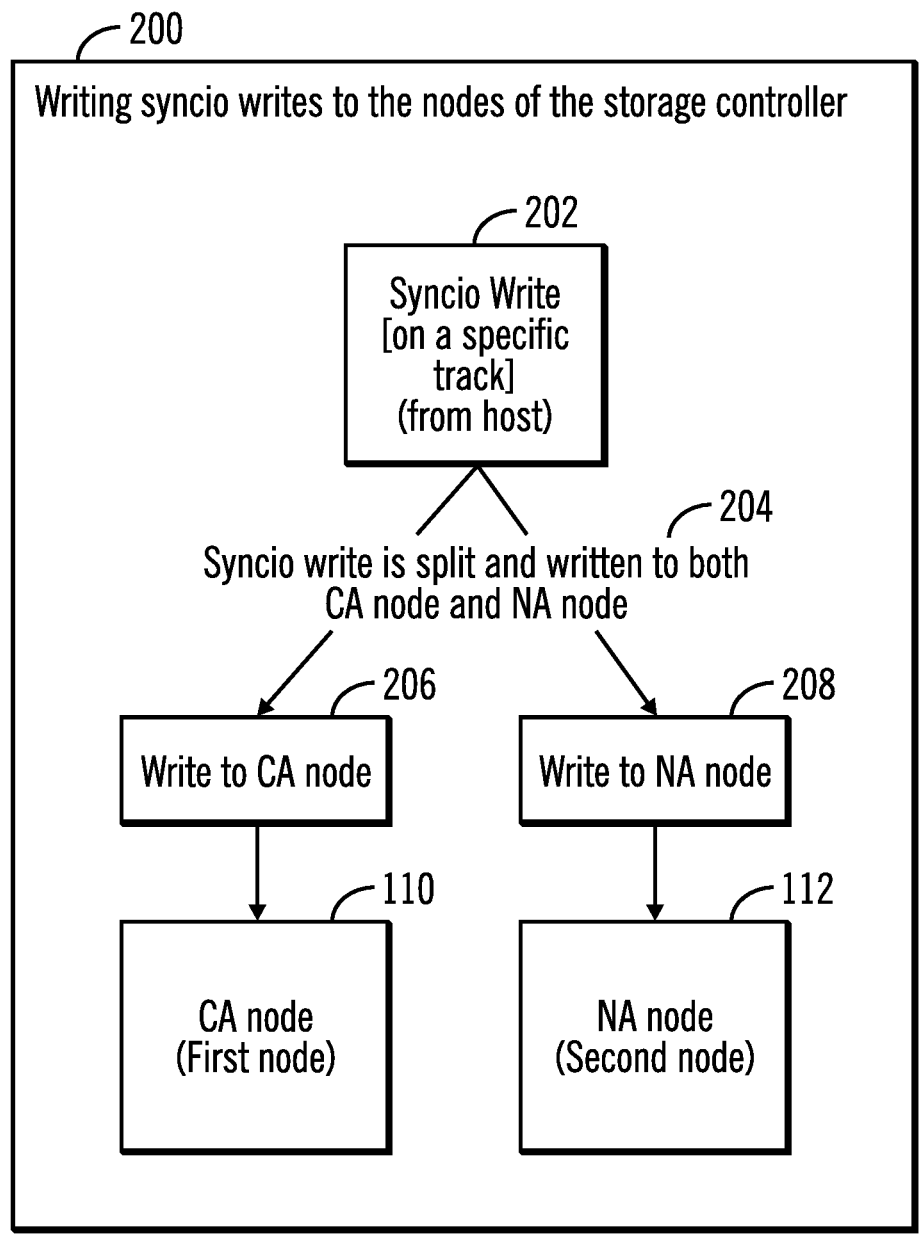
FIG. 2 illustrates a block diagram that shows how a syncio write is written to the nodes of the storage controller, in accordance with certain embodiments.

FIG. 2 illustrates a block diagram 200 that shows how a syncio write is written to the nodes of the storage controller 102, in accordance with certain embodiments. The operations shown in FIG. 2 may occur in the computing environment 100.

Control starts at block 202 in which a syncio write occurs on a specific track from the host 104. The storage controller 102 receives the syncio write from the host 104 over the bus interface 122.

The storage controller 102 splits the syncio write and performs identical writes to both the CA node 110 and the NA node 112 (as shown via reference numerals 204, 206, 208). So the syncio write is duplicated for writing on both the CA node 110 and the NA node.

Figure 3:
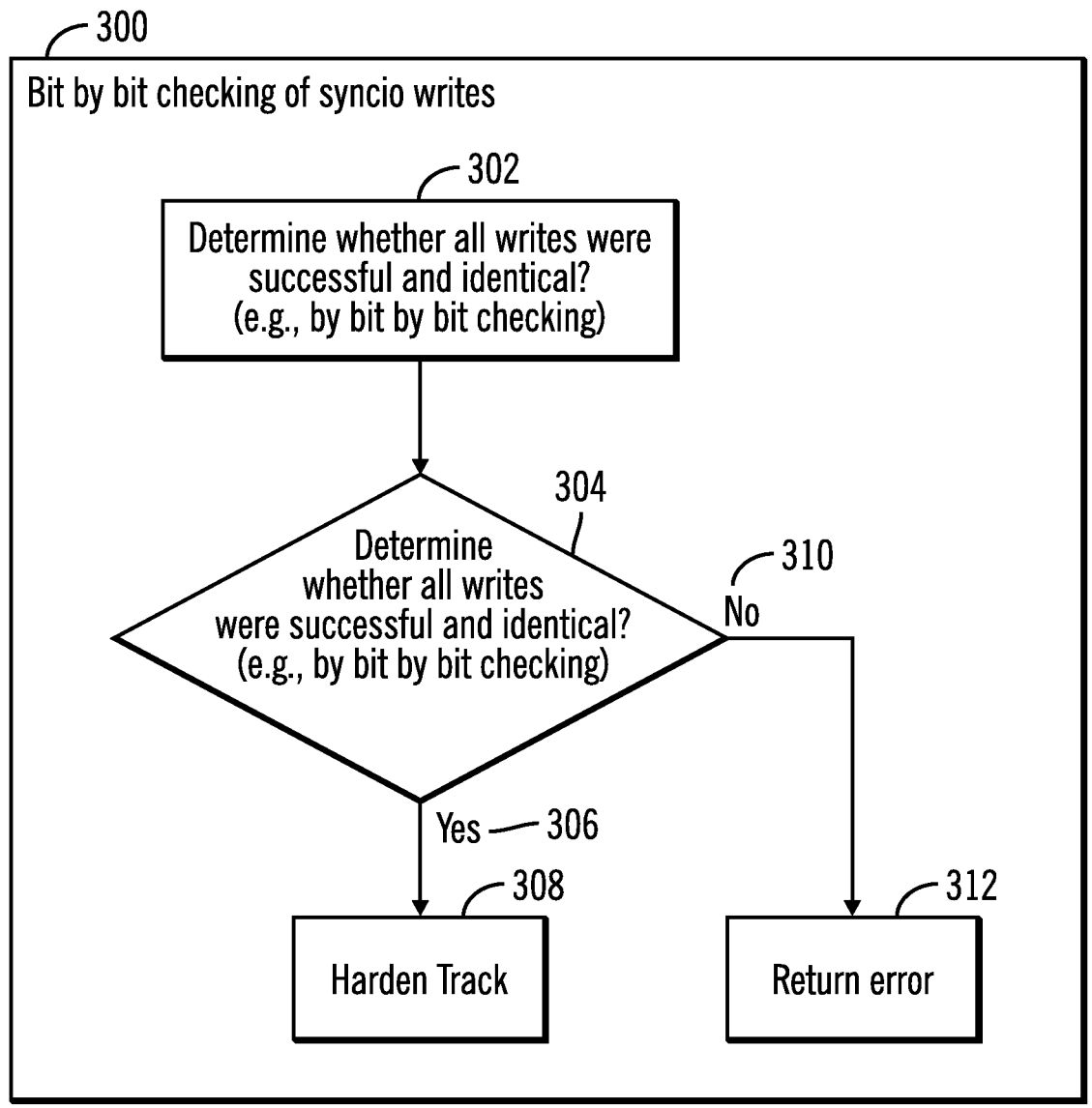
FIG. 3 illustrates a flowchart that shows how bit by bit checking may be performed on a track before hardening the track, in accordance with certain embodiments.

FIG. 3 illustrates a flowchart 300 that shows how bit by bit checking may be performed on a track before hardening the track when syncio writes are performed on a track, in accordance with certain embodiments. The operations shown in FIG. 3 may be performed in the storage controller 102.

Control starts at block 302 in which the storage controller 102 determines that all writes have been completed to a track. The storage controller 102 then determines (at block 304) whether all writes (this includes syncio writes) were successful and identical on the CA node 110 and the NA node 112 bit by bit checking of all bits or the track.

If at block 304 it is determined that the all writes are successful and identical ("Yes" branch 306) then control proceeds to block 308 where the track is hardened (i.e., committed). If at block 304 it is determined that the not all writes are successful and identical ("No" branch 310) then control proceeds to block 312 where the storage controller 102 returns an error indication to the host 104.

The bit by bit checking at block 304 is time consuming and in certain embodiments, the data difference checking application 130 may utilize additional mechanisms to improved performance as described in FIGS. 4-10.

Figure 4:
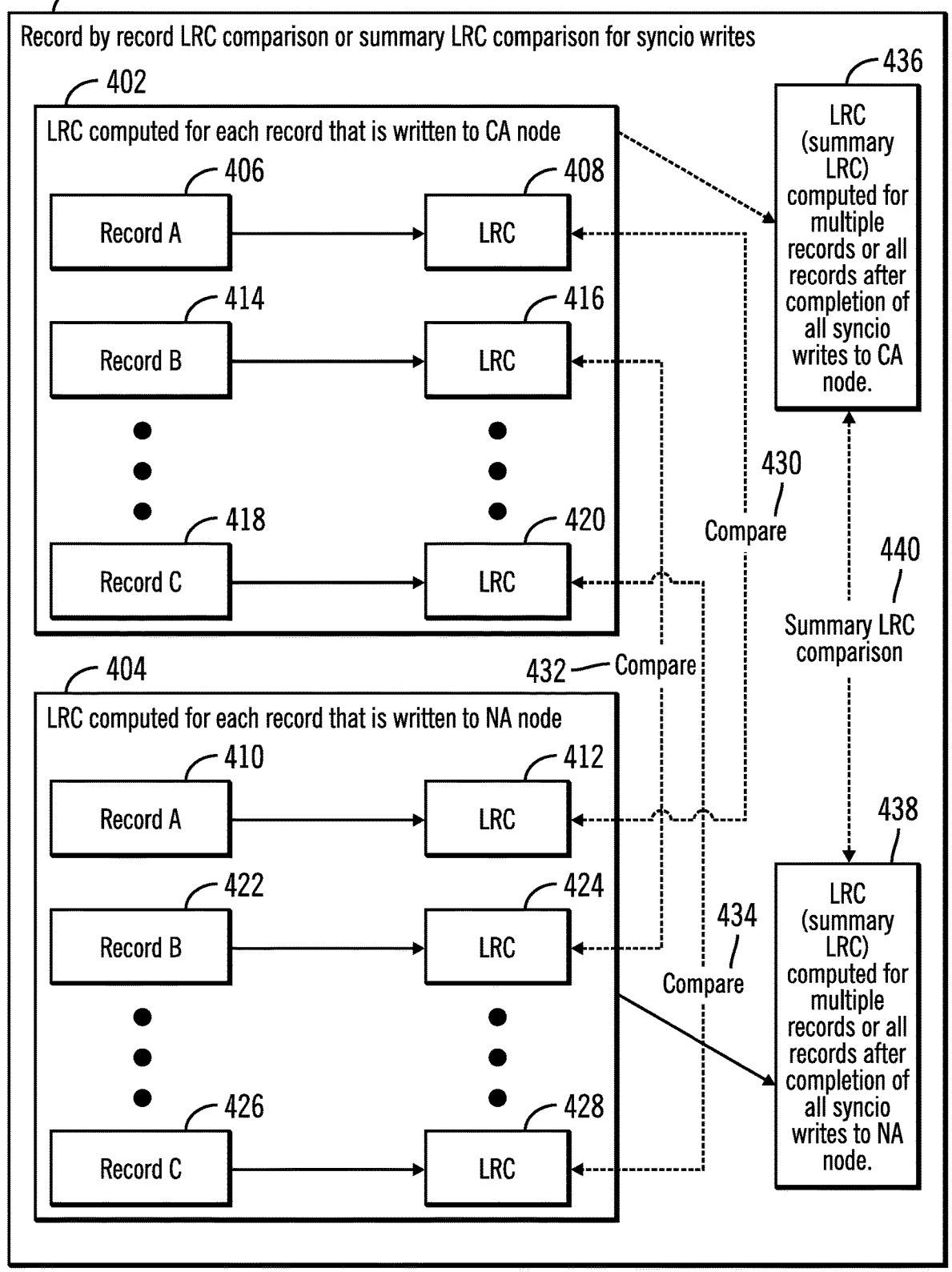
FIG. 4 illustrates a block diagram that shows how record by record longitudinal redundancy check (LRC) checks or summary LRC checks for syncio writes may be performed, in accordance with certain embodiments.

FIG. 4 illustrates a block diagram 400 that shows how record by record longitudinal redundancy check (LRC) checks or summary LRC checks for syncio writes may be performed, in accordance with certain embodiments. The operations shown in FIG. 4 may be performed in the storage controller 102.

FIG. 4 shows that a LRC is computed for each record that is written to the CA node 110 via syncio write (shown via reference numeral 402) as each record is written. Similarly a LRC is computed for each record that is written to the NA node via syncio write (shown via reference numeral 404).

For example, as record A 406 is written to the CA node 110 via a syncio write the LRC 408 for record A 406 is computed, and as the same record A 410 is written to the NA node 112 the LRC 412 for record 410 is computed. Similarly the other records 414, 418, 422, 426 also have their corresponding calculated LRC values 416, 420, 424, 428.

As each record is written via syncio write to the CA node 110 and the NA node 112, the LRC value of the record written to CA node 110 is compared to the LRC value of the record written to the NA node 112 by the data difference checking application 130. If the LRC values of a record written the CA node 110 and the NA node 112 do not match then the record is not identical in content in the CA node 110 and the NA node 112 and an error indication is sent to the host 104 from the storage controller 102.

FIG. 4 shows record A 406, 410 being checked for differences by comparison of LRC 408 and 412 (as shown via reference numeral 430). Record B 414, 422 is shown as being checked for differences by comparison of LRC 416 and 424 (as shown via reference numeral 432). Record C 418, 426 is shown as being checked for differences by comparison of LRC 420 and 428 (as shown via reference numeral 434).

In certain embodiments, a LRC may be computed for multiple records or all records after completion of all syncio writes to the CA node 110 (as shown via reference numeral 436), and this computed LRC is referred to as a summary LRC for the CA node on completion of all syncio writes. Similarly a LRC may be computed for multiple records or all records after completion of all syncio writes to the NA node 112 (as shown via reference numeral 438), and this computed LRC is referred to as a summary LRC for the NA node on completion of all syncio writes. In certain embodiments, the summary LRC for the CA node is compared to the summary LRC of the NA node (as shown via reference numeral 440), and if the summary LRC of the CA node and the summary LRC for the NA node do not match an error is returned to the host 104 from the storage controller 102 as there are differences in records written via syncio writes to the CA node and the NA node.

Figure 5:
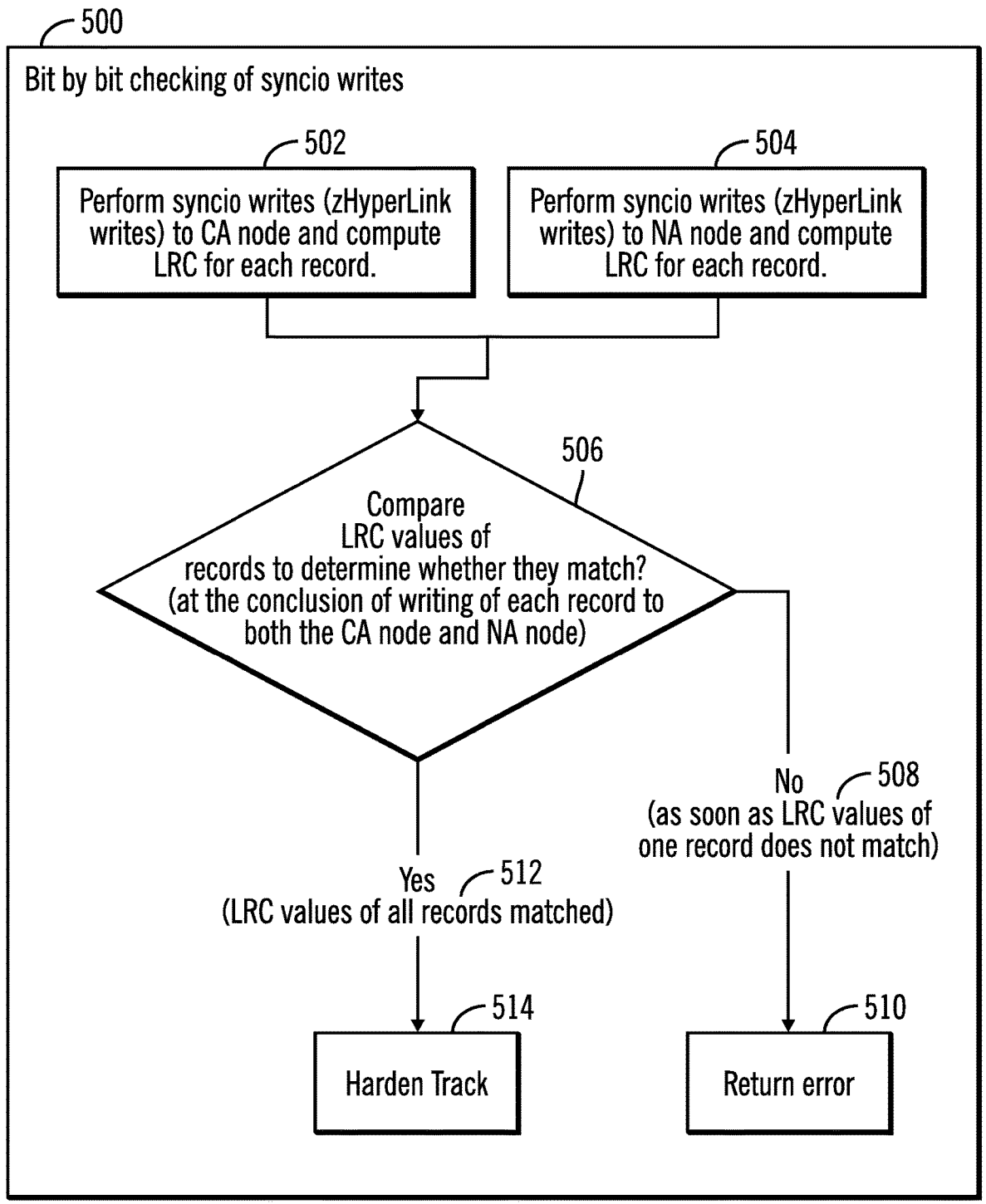
FIG. 5 illustrates a flowchart that shows how record by record LRC checking may be performed on a track to determine errors faster than bit by bit checking of the track, in accordance with certain embodiments.

FIG. 5 illustrates a flowchart 500 that shows how record by record LRC checking may be performed on a track to determine errors faster than bit by bit checking of the track, in accordance with certain embodiments. The operations shown in FIG. 5 may be performed by the data difference checking application 130 that executes in the storage controller 102.

Control starts at block 502 and 504 that are performed in parallel. In block 502 the storage controller 102 performs syncio writes (e.g., zHyperLink writes) to the CA node 110 and the LRC for each record is computed in the CA node 110. In block 504 the storage controller 102 performs syncio writes (e.g., zHyperLink writes) to the NA node 112 and the LRC for each record is computed in the NA node 112.

From blocks 502 and 504 control proceeds to block 506 where at the conclusion of the writing of each record to the CA node 110 and the NA node 112 the LRC values of the record are compared by the data difference checking application 130. As soon as LRC values of one record does not match ("No" branch 508) an error indication is returned to the host 104 from the storage controller 102 to indicate that there were errors in syncio writes for the record (as shown via reference numeral 510).

If LRC values of all records match ("Yes" branch 512) between the CA node 110 and the NA node 112, then the track to which syncio writes have been performed is hardened (at block 514).

In certain alternative embodiments, instead of computing LRC values for each record, a summary LRC value may be computed for a group of records or all records at the conclusion of syncio writes in both the CA node 110 and the NA node 112, and the hardening or tracks may be performed if the summary LRC values match between the CA node 110 and the NA node 112, otherwise an error is returned to the host 104.

Therefore, a summary LRC value or a plurality of LRC values are determined for both the NA and CA nodes at the conclusion of the syncio writes to a track prior to hardening (i.e., committing) the track, where hardening the track means that the contents of the track have been verified to be correctly written and the track is ready to be destaged or destaged to storage drives.

There may be multiple options for generating the summary LRC from data fields or records. The headers associated with the data fields or records have sufficient self-describing data to understand the starting and ending points of each data field or record for a track. A determination may also made of the records that were written by the bus interface 122 while track access was held for syncio.

In certain embodiments, the LRC is 2 bytes, and the 2 byte LRC is compact enough to be passed from the NA node 112 to the CA node 110 via a commit track mail. Then once the CA node 110 is complete and ready for track commit, it will also generate the summary LRC using a similar mechanism to the NA node 112. The values are compared. If they are not the same, error evaluation/recovery/protection is performed immediately and this prevents any usage of the track while it is an error state.

Alternative embodiments may use other types of error checking. The frequency of the checking may be changed based on performance, workload, or criteria that includes how frequently differences are detected. For example, a higher detection rate may lead to more frequent checking in certain embodiments.

Figure 6:
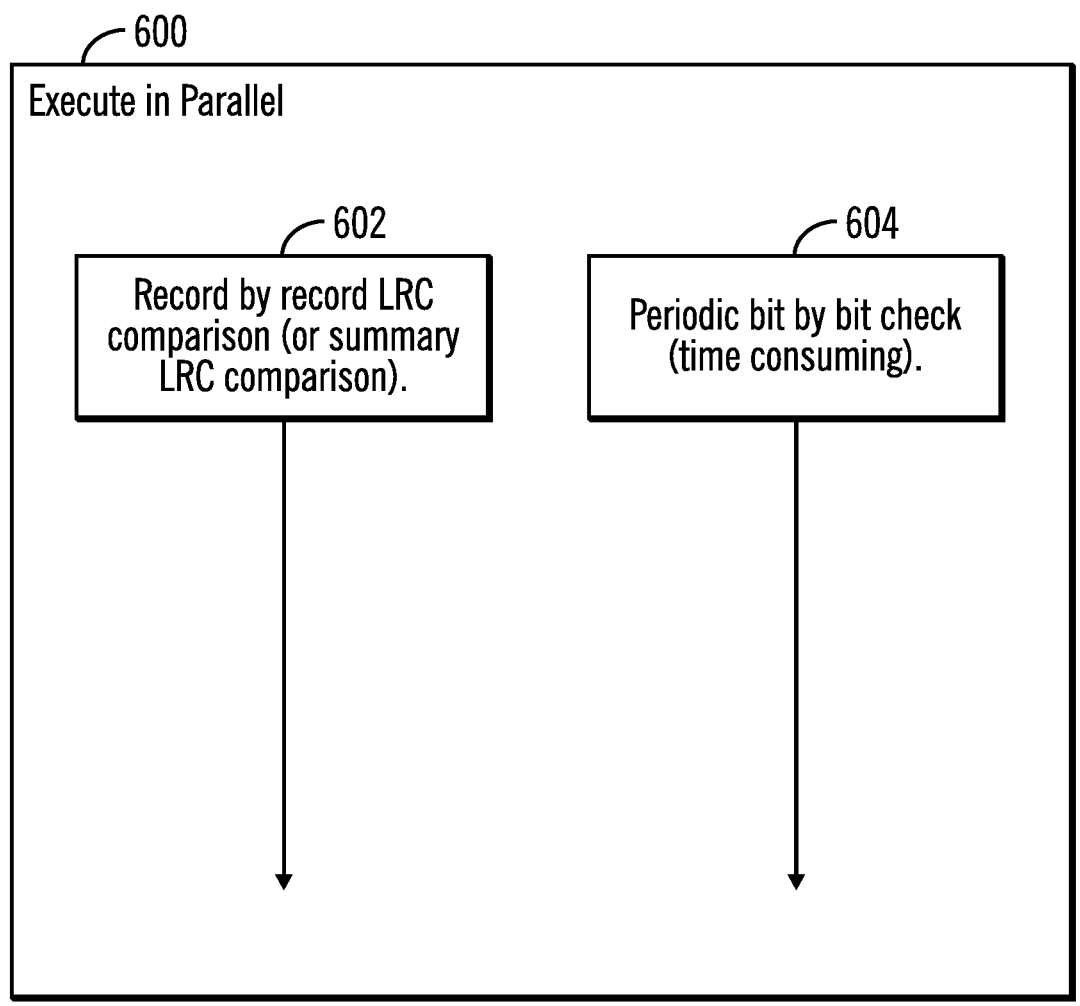
FIG. 6 illustrates a block diagram that shows record by record checking on track being performed in parallel with periodic bit by bit checking, in accordance with certain embodiments.

FIG. 6 illustrates a block diagram 600 that shows record by record checking 602 via LRC or summary LRC checking on track being performed in parallel with periodic bit by bit checking 604, in accordance with certain embodiments. In case the record by record checking via LRC or summary LRC checking on track fails because the LRC values or the summary LRC values match even though there are differences in the track written to the CA node 110 and the NA node 112, the periodic bit by bit checking which is time consuming is able to detect the errors. As a result, in certain embodiments while the overwhelming majority of syncio errors are caught quickly, in a few rare situations the bit by bit check of the track on the CA node 110 and the NA node 112 is used as a fallback option to catch all syncio errors.

Figure 7:
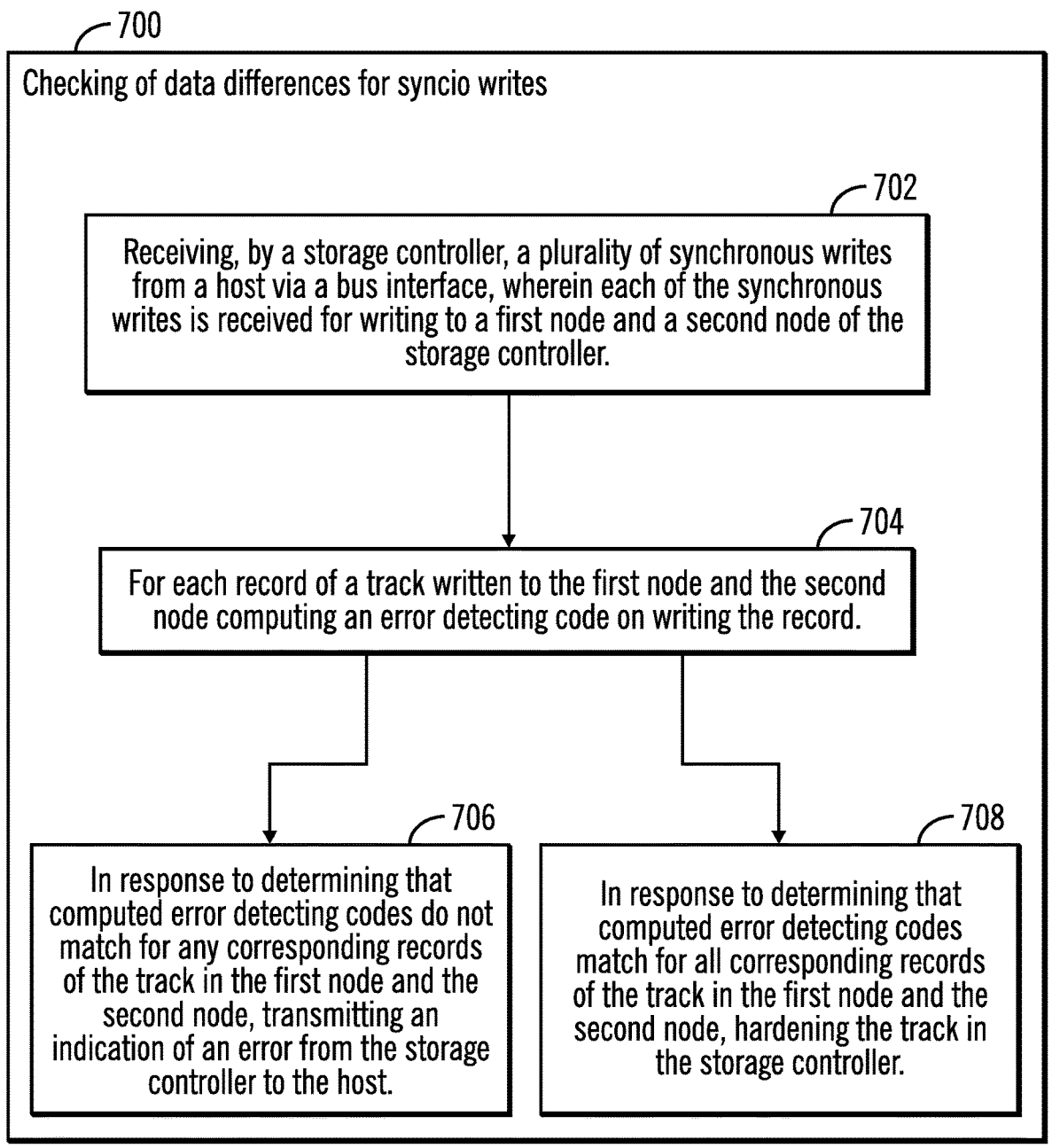
FIG. 7 illustrates a flowchart that shows the checking of data difference for syncio writes performed via a bus interface to a dual-server storage controller, in accordance with certain embodiments.

FIG. 7 illustrates a flowchart 700 that shows the checking of data difference for syncio writes performed via a bus interface 122 to a dual-server storage controller 102, in accordance with certain embodiments. The operations shown in FIG. 7 may be performed in the storage controller 102.

Control starts at block 702 in which a storage controller 102 receives a plurality of synchronous writes from a host 104 via a bus interface 122, wherein each of the synchronous writes is received for writing to a first node 110 (e.g. CA node) and a second node (e.g., NA node) of the storage controller 102.

For each record of a track written to the first node and the second node, an error detecting code is computed on writing the record (at block 704). In certain embodiments, the error detecting code is an LRC code.

From block 704 control proceeds in parallel to block 706 and 708. At block 706, in response to determining that computed error detecting codes do not match for any corresponding records of the track in the first node 110 and the second node 112, an indication of an error is transmitted from the storage controller 102 to the host 104.

At block 708, in response to determining that computed error detecting codes match for all corresponding records of the track in the first node 110 and the second node 112, the track is hardened in the storage controller 102.

In additional embodiments, a few error types may be returned (at block 706) to the host 104 to signal the need for more recovery (either via the bus interface 122 in the status for the next access to a writeset, or via the traditional network interface 124 with an attention message, health check message, etc.). This allows the host 104 to initiate a dump or statesave, or the host 104 may perform more checking on the data it sends to the storage controller 102, or force a redrive of the writes to the track with the mismatch for recovery. This way there is no data loss or disruption to I/O. In certain embodiments the CA node 110 may pin the track and send a token (writeset) to the host. If the host writes the track with the same token (writeset), then the track may be unpinned. If no host recovery action is taken, the track remains pinned.

Therefore, FIGS. 1-7 illustrate certain embodiments to ensure that syncio writes have been written properly to the CA node 110 and the NA node 112 of the storage controller 102 by comparing LRC of records written to the CA node 110 and the NA node 112, without necessarily comparing the bits of the entirety of a track.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
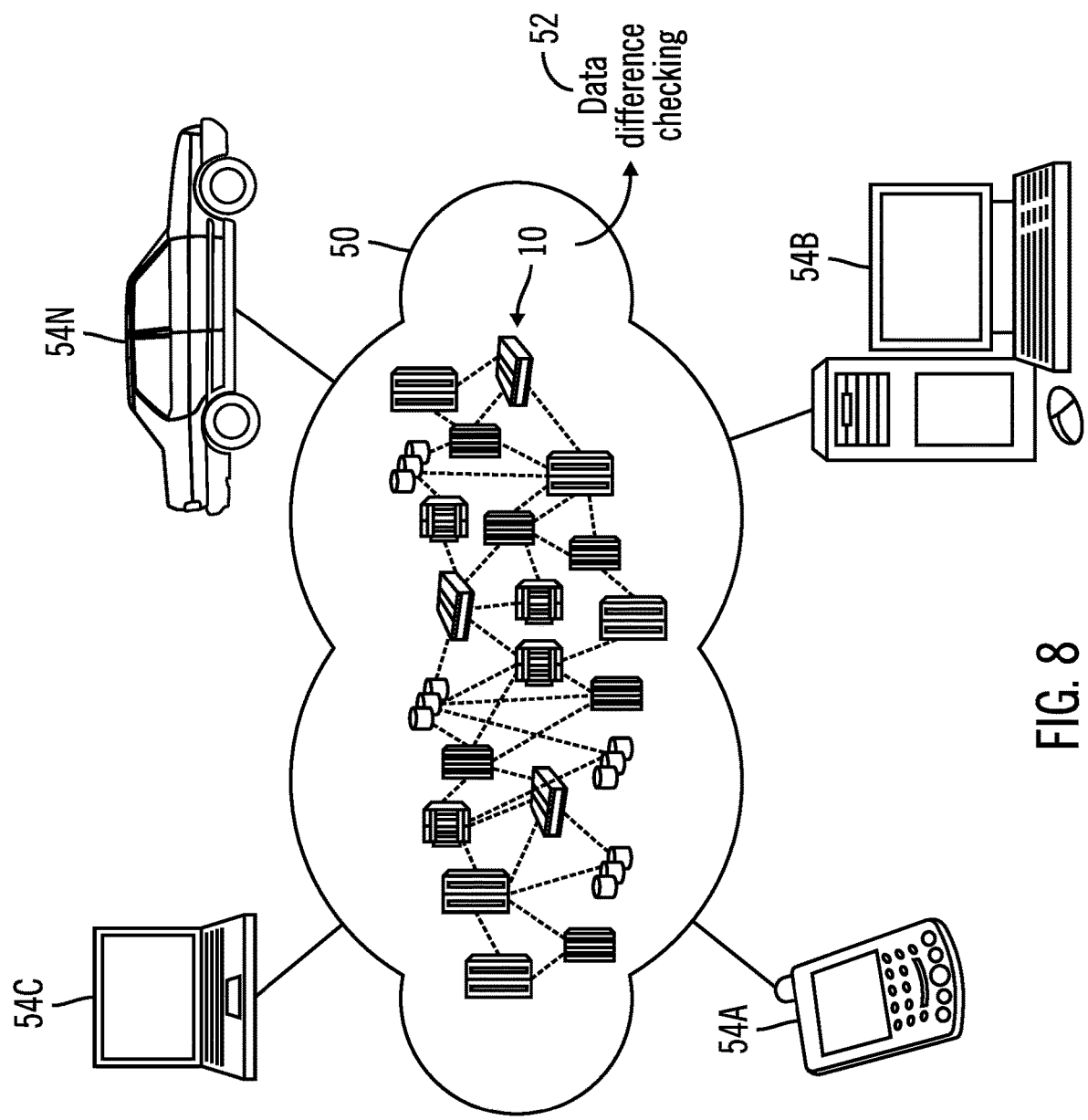
FIG. 8 illustrates a block diagram of a cloud computing environment, in accordance with certain embodiments.

Referring now to FIG. 8 an illustrative cloud computing environment 50 is depicted. Data difference checking (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 9:
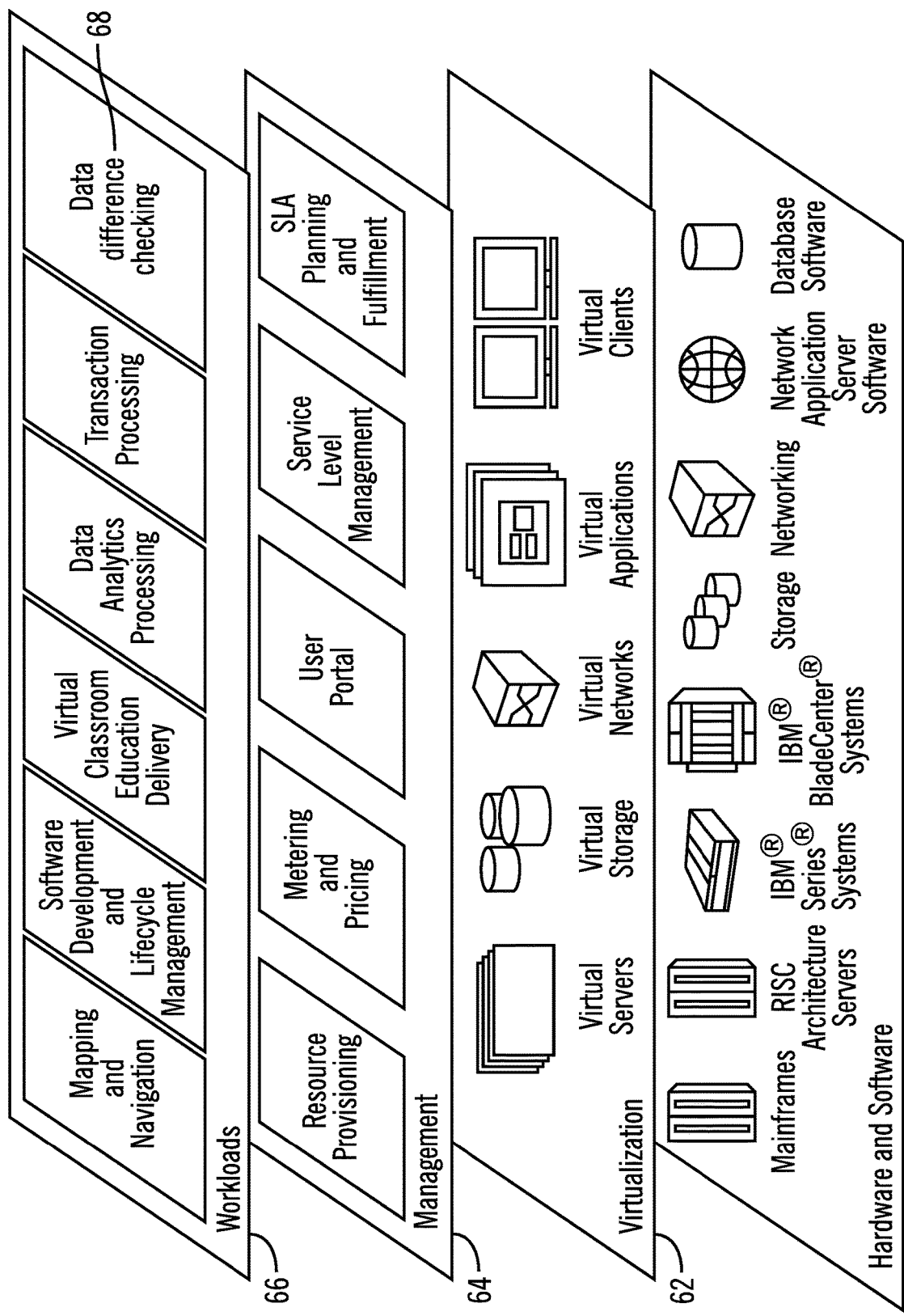
FIG. 9 illustrates a block diagram of further details of the cloud computing environment of FIG. 8 in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data difference checking 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
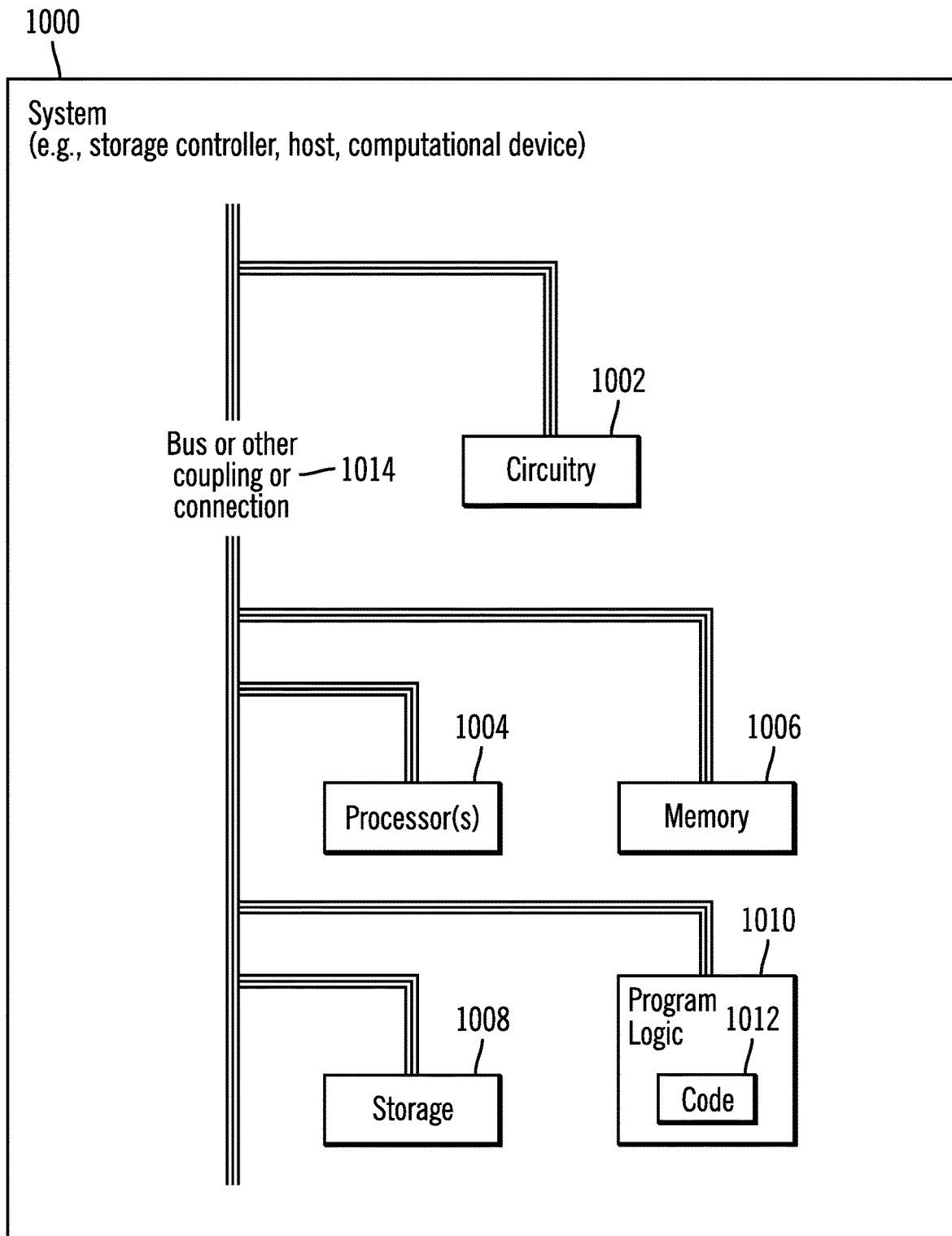
FIG. 10 illustrates a block diagram of a computational system that shows certain elements that may be included in the storage controllers or the host, as described in FIGS. 1-9, in accordance with certain embodiments.

FIG. 10 illustrates a block diagram that shows certain elements that may be included in the storage controller 102, the first node 110, the second node 112, or the hosts 104 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. While FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise, The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. * IBM, ZSERIES, PSERIES, XSERIES, BLADECENTER, WEBSPHERE, DB2, ZHYPERLINK are trademarks or registered trademarks of International Business Machines Corporation registered in many jurisdictions worldwide.

What is claimed is:

1. A method, comprising:
    receiving, by a storage controller, a plurality of synchronous writes from a host via a bus interface, wherein each of the synchronous writes is received for writing to a first node and a second node of the storage controller;
    for each record of a track written to the first node and the second node, computing an error detecting code on writing the record; and
    in response to determining that computed error detecting codes do not match for any corresponding records of the track in the first node and the second node, transmitting an indication of an error from the storage controller to the host.

2. The method of claim 1, the method further comprising:
    in response to determining that computed error detecting codes match for all corresponding records of the track in the first node and the second node, hardening the track in the storage controller.

3. The method of claim 2, wherein the synchronous writes are performed over a bus interface between the host and the storage controller via a syncio process, and wherein a summary error detecting code comprising the error detecting code of a plurality of records is compared for records of the first node and the second node to determine whether the records of the first node and the records of the second node have been written correctly via the plurality of synchronous writes.

4. The method of claim 3, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via a network interface.

5. The method of claim 4, wherein a synchronous write is written to a cache of the first node and a non-volatile storage of the second node, and wherein the error detecting code is a longitudinal redundancy check (LRC) code.

6. The method of claim 2, wherein a bit by bit comparison of the track is also performed between the first node and the second node prior to the hardening.

7. The method of claim 1, wherein in response to receiving the indication of the error, the host recovers from the error by at least retransmitting writes for records with different computed error codes in the first and second node.

8. The method of claim 1, wherein in response to receiving the indication of the error, the host performs additional checks on data transmitted via the synchronous writes to the first node and the second node.

9. A system, comprising:
    a memory; and
    a processor coupled to the memory, wherein the processor performs operations, the operations comprising:
    receiving a plurality of synchronous writes from a host via a bus interface, wherein each of the synchronous writes is received for writing to a first node and a second node of the system;
    for each record of a track written to the first node and the second node, computing an error detecting code on writing the record; and
    in response to determining that computed error detecting codes do not match for any corresponding records of the track in the first node and the second node, transmitting an indication of an error to the host.

10. The system of claim 9, the operations further comprising:
    in response to determining that computed error detecting codes match for all corresponding records of the track in the first node and the second node, hardening the track.

11. The system of claim 10, wherein the synchronous writes are performed over a bus interface between the host and the system via a syncio process, and wherein a summary error detecting code comprising the error detecting code of a plurality of records is compared for records of the first node and the second node to determine whether the records of the first node and the records of the second node have been written correctly via the plurality of synchronous writes.

12. The system of claim 11, wherein the syncio process allows the host to hold an application thread in a spin loop waiting for a write operation to complete, and wherein the syncio process performs reservation of tracks for performing writes for a greater duration of time prior to performing the writes on the tracks in comparison to other processes that perform writes on the tracks via a network interface.

13. The system of claim 12, wherein a synchronous write is written to a cache of the first node and a non-volatile storage of the second node, and wherein the error detecting code is a longitudinal redundancy check (LRC) code.

14. The system of claim 10, wherein a bit by bit comparison of the track is also performed between the first node and the second node prior to the hardening.

15. The system of claim 9, wherein in response to receiving the indication of the error, the host recovers from the error by at least retransmitting writes for records with different computed error codes in the first and second node.

16. The system of claim 9, wherein in response to receiving the indication of the error, the host performs additional checks on data transmitted via the synchronous writes to the first node and the second node.

17. A computer program product, the computer program product comprising a computer readable storage medium having computer readable program code embodied therewith, the computer readable program code configured to perform operations, the operations comprising:
    receiving, by a storage controller, a plurality of synchronous writes from a host via a bus interface, wherein each of the synchronous writes is received for writing to a first node and a second node of the storage controller;
    for each record of a track written to the first node and the second node, computing an error detecting code on writing the record; and
    in response to determining that computed error detecting codes do not match for any corresponding records of the track in the first node and the second node, transmitting an indication of an error from the storage controller to the host.

18. The computer program product of claim 17, the operations further comprising:
    in response to determining that computed error detecting codes match for all corresponding records of the track in the first node and the second node, hardening the track in the storage controller.

19. The computer program product of claim 18, wherein the synchronous writes are performed over a bus interface between the host and the storage controller via a syncio process, and wherein a summary error detecting code comprising the error detecting code of a plurality of records is compared for records of the first node and the second node to determine whether the records of the first node and the records of the second node have been written correctly via the plurality of synchronous writes.

20. The computer program product of claim 19, wherein the syncio process allows the host to hold an application thread in a spin loop waiting for a write operation to complete, and wherein the syncio process performs reservation of tracks for performing writes for greater duration of time prior to perforating the writes on the tracks in comparison to other processes that perform writes on the tracks via a network interface.

21. The computer program product of claim 20, wherein a synchronous write is written to a cache of the first node and a non-volatile storage of the second node, and wherein the error detecting code is a longitudinal redundancy check (LRC) code.

22. The computer program product of claim 18, wherein a bit by bit comparison of the track is also performed between the first node and the second node prior to the hardening.

23. The computer program product of claim 17, wherein in response to receiving the indication of the error, the host recovers from the error by at least retransmitting writes for records with different computed error codes in the first and second node.

24. The computer program product of claim 17, wherein in response to receiving the indication of the error, the host performs additional checks on data transmitted via the synchronous writes to the first node and the second node.

* * * * *